United States Patent
Snyder

(10) Patent No.: US 8,494,374 B2
(45) Date of Patent: Jul. 23, 2013

(54) PORTABLE LIGHT PROVIDING ILLUMINATION AND DATA

(75) Inventor: Mark W. Snyder, Hockessin, DE (US)

(73) Assignee: Streamlight, Inc., Eagleville, PA (US)

( * ) Notice: Subject to any disclaimer, the term of this patent is extended or adjusted under 35 U.S.C. 154(b) by 356 days.

(21) Appl. No.: 12/814,862

(22) Filed: Jun. 14, 2010

(65) Prior Publication Data

US 2011/0305460 A1 Dec. 15, 2011

(51) Int. Cl.
H04B 10/00 (2006.01)
F21L 4/00 (2006.01)

(52) U.S. Cl.
USPC .......................................... 398/172; 362/157

(58) Field of Classification Search
USPC .......................................... 398/172; 362/157
See application file for complete search history.

(56) References Cited

U.S. PATENT DOCUMENTS

| | | | |
|---|---|---|---|
| 4,149,224 A | 4/1979 | King et al. | |
| 4,281,253 A * | 7/1981 | Culver | 250/551 |
| 6,585,391 B1 | 7/2003 | Koch et al. | |
| 6,821,003 B2 | 11/2004 | Baker et al. | |
| 7,072,587 B2 * | 7/2006 | Dietz et al. | 398/138 |
| 7,151,433 B2 | 12/2006 | Chun | |
| 7,496,297 B2 | 2/2009 | Sun et al. | |
| 7,646,973 B2 | 1/2010 | Howard et al. | |
| 7,674,003 B2 | 3/2010 | Sharrah et al. | |
| 7,883,243 B2 | 2/2011 | Snyder | |
| 7,889,997 B2 * | 2/2011 | Won | 398/169 |
| 2007/0058987 A1 | 3/2007 | Suzuki | |
| 2007/0092264 A1 | 4/2007 | Suzuki et al. | |
| 2007/0147843 A1 * | 6/2007 | Fujiwara | 398/118 |
| 2008/0049433 A1 * | 2/2008 | Sharrah et al. | 362/362 |
| 2009/0067846 A1 * | 3/2009 | Yu et al. | 398/128 |
| 2009/0297166 A1 * | 12/2009 | Nakagawa et al. | 398/172 |

* cited by examiner

*Primary Examiner* — Nathan Curs

(74) *Attorney, Agent, or Firm* — Clement A. Berard, Esq.; Dann, Dorfman, Herrell & Skillman, PC

(57) ABSTRACT

A system may comprise a portable light and a receiver therefor. The portable light for illuminating may comprise: a light source, a housing supporting the light source, a processor selectively energizing the light source from an electrical power source to produce illumination, a switch controlling the processor, and a memory storing data relating to the portable light, wherein the processor modulates the light source responsive to the stored data. The receiver receiving data transmitted by the portable light may comprise: a receiver housing including a light sensitive receiver receiving data emitted by the light source; and a receiver processor reproducing a representation of the data stored in the memory and providing the decoded received data for perception by a human and/or for use by a computing device.

32 Claims, 5 Drawing Sheets

PORTABLE LIGHT PROVIDING ILLUMINATION AND DATA

The present invention relates to a portable light and, in particular, to a portable light that provides illumination and data, and to a receiver therefor.

Portable lights such as flashlights are in widespread use in many different environments by many different types of users. Some users are engaged in tasks and/or are in environments that may create challenges for the user and/or for the light itself. Among the information that may be of interest in such situations are information about the environment and/or conditions to which the user is exposed and/or under which the light operates.

Future industrial, government and military applications may require lights that can sense and record environmental data, such as temperature, gases, toxic agents, and the like. In such cases it would be helpful if the light could also function as a data device, e.g., thereby to relieve the user from having to carry one or more different data collection devices, which typically may be inconvenient and awkward, and which could involve considerable expense to purchase and maintain different types of devices.

Moisture and water are examples of relatively benign conditions to which a light and its operator may be exposed, and lights are typically sealed, e.g., by O-ring and other seals, to resist being affected by these conditions. While O-rings provide relatively simple and reliable seals, the reliability of a light will tend to decrease as the number and complexity of its seals increases. Thus, many lights employ a one piece body to which a head and/or a tail piece attaches, with the attachment being sealed by an O-ring or other seal.

If a light were to include one or more data or other sensors, however, additional openings would have to be provided in the light housing for a connector or other data port through which the data could be transmitted by the light or through which a data memory card could be installed and removed. This creates the need for additional seals, and the attendant additional complexity and seals that are needed, which tends to reduce the reliability of the light as well as increase the cost thereof. Moreover, connector terminals are subject to contamination which decreases their reliability and to contact make/break sparking which can be dangerous in a hazardous, e.g., combustible and/or explosive, environment.

Accordingly, there is a need for a portable light that can transmit data without the need for an opening through which the data can be transmitted and without the adverse effect thereof on reliability and cost.

To this end, a portable light may comprise: a light source producing illumination when energized; a housing supporting the light source and having a cavity for receiving an electrical power source; a processor for selectively energizing the light source to produce illumination when an electrical power source is in the cavity of the housing; a switch coupled to the processor for controlling the selective energization of the light source to produce illumination; and a memory coupled to the processor and storing data relating to the portable light, wherein the processor causes modulation of the light source responsive to the data stored in the memory in addition to the selectively energizing the light source to produce illumination.

A receiver for receiving modulated data transmitted by a portable light wherein the data is stored in a memory of the portable light and is transmitted by an illumination light source thereof, the receiver for receiving data transmitted by the illumination light source of the portable light may comprise: a receiver housing; a light sensitive receiver located in the receiver housing for receiving modulated data emitted by the illumination light source of the portable light and for providing an electrical representation thereof; and a receiver processor decoding the electrical representation of the received modulated data to reproduce a representation of the data stored in the memory of the portable light, wherein the receiver processor provides the decoded received data for perception by a human and/or for use by a computing device.

A system including a portable light for producing illumination and transmitting data and a receiver for receiving data transmitted by the portable light, wherein the portable light may comprise: a light source producing illumination when energized; a housing supporting the light source and having a cavity for receiving an electrical power source; a processor for selectively energizing the light source to produce illumination when an electrical power source is in the cavity of the housing; a switch coupled to the processor for controlling the selective energization of the light source to produce illumination; and a memory coupled to the processor and storing data relating to the portable light, wherein the processor causes modulation of the light source responsive to the data stored in the memory in addition to the selectively energizing the light source to produce illumination; and wherein the receiver for receiving data transmitted by the portable light may comprise: a light sensitive receiver for receiving modulated data emitted by the light source; and a receiver processor decoding the received modulated data to reproduce a representation of the data stored in the memory of the portable light, wherein the receiver processor provides the decoded received data for perception by a human and/or for use by a computing device.

BRIEF DESCRIPTION OF THE DRAWING

The detailed description of the preferred embodiment(s) will be more easily and better understood when read in conjunction with the FIGURES of the Drawing which include.

Figure 1:
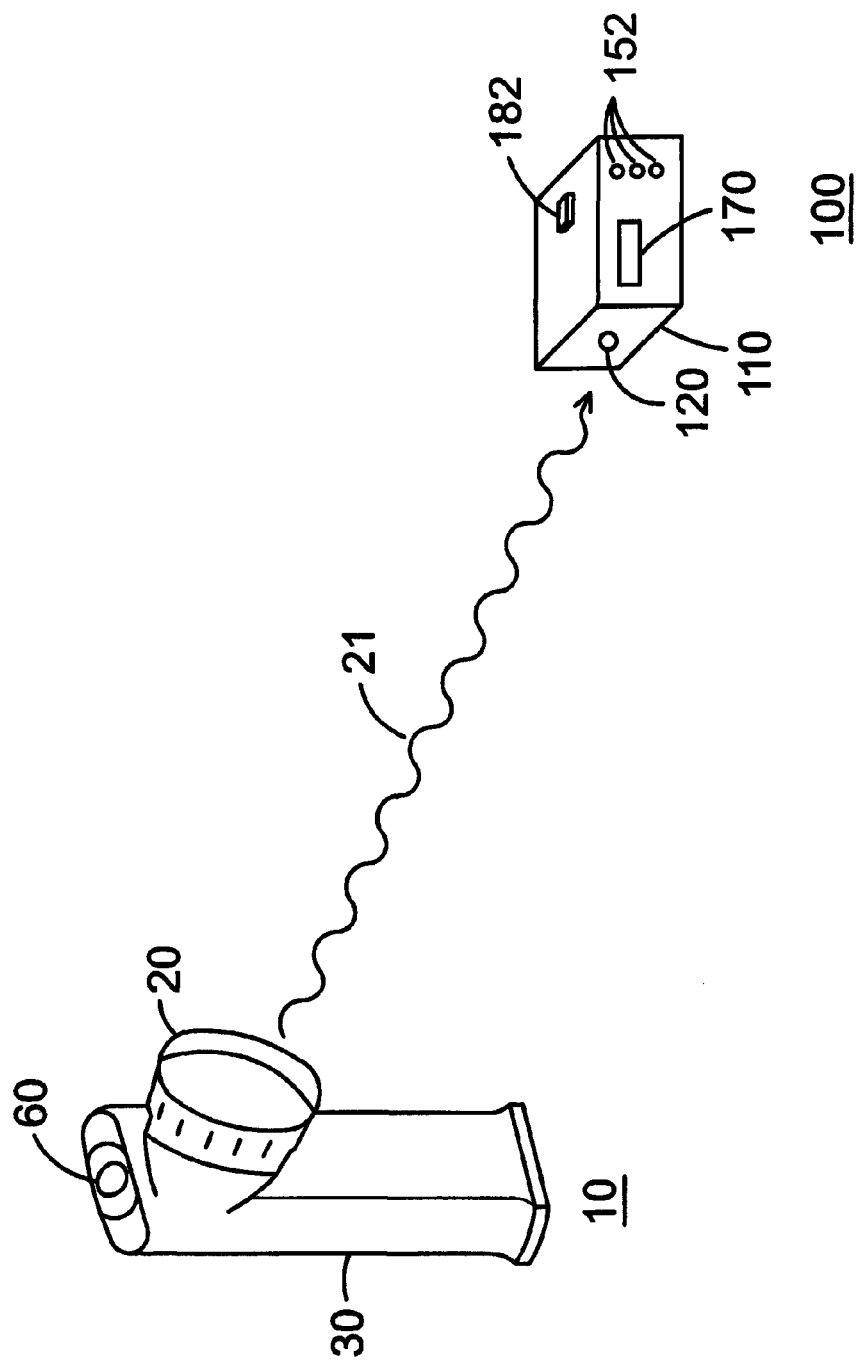
FIG. 1 is a view of an example embodiment of a portable light according to the described arrangement and an example receiver usable with the example portable light.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

FIG. 1 is a view of an example embodiment of a portable light 10 according to the described arrangement and an example receiver 100 usable with the example portable light 10. Light 10 and receiver 100 may be considered as a system, e.g., a system for providing illumination and for transmitting and receiving data, or as separate devices. Light 10 includes a housing 30 that has a switch 60 thereon for controlling the energization of light source 20 for producing illumination. Not visible is a source of electrical energy, typically a battery contained within housing 30. Switch 60 may be actuated one or more times, for shorter times and/or longer times, and/or in sequences thereof for operating and controlling light 10.

In addition to producing illumination via light source 20, light 10 is also responsive to actuation of switch 60 for light source 20 to produce messages 21 containing representations of data that is stored and/or sensed by elements of light 10. The messages 21 that are produced by light source 20 are typically at a lower level of light intensity than is the illumination produced by light source 20. In one preferred embodiment, light source 20 includes a solid state light source 20, e.g., a light emitting diode, for providing illuminating light either momentarily, continuously, intermittently and/or at various different light intensities, and for providing messaging light 21 typically in a substantially on/off pulsing manner in which the data contained therein may be modulated and/or encoded.

Receiver 100 includes a housing 110 that supports a light sensitive element 120, e.g., a photo-sensor 120, upon which messages 21 are directed to impinge when it is desired for the data contained in messages 21 be received and processed by receiver 100. Information contained in messages 21 processed by receiver 100, e.g., to demodulate and/or decode the information contained therein, may be displayed on a display 170, e.g., as text and/or image data, and/or may be communicated to a device external to receiver 100, .g., via a connection port 182. Receiver 100 also typically includes one or more buttons, switches and/or other controls 152 for operating and controlling receiver 100, e.g., for turning receiver 100 ON and OFF, for receiving data messages 21, for clearing and/or refreshing data message displays, for communicating data via connection port 182, for storing data in a memory of receiver 100, and the like, as may be desired by an operator of receiver 100 actuating controls 152 thereof.

Figure 2:
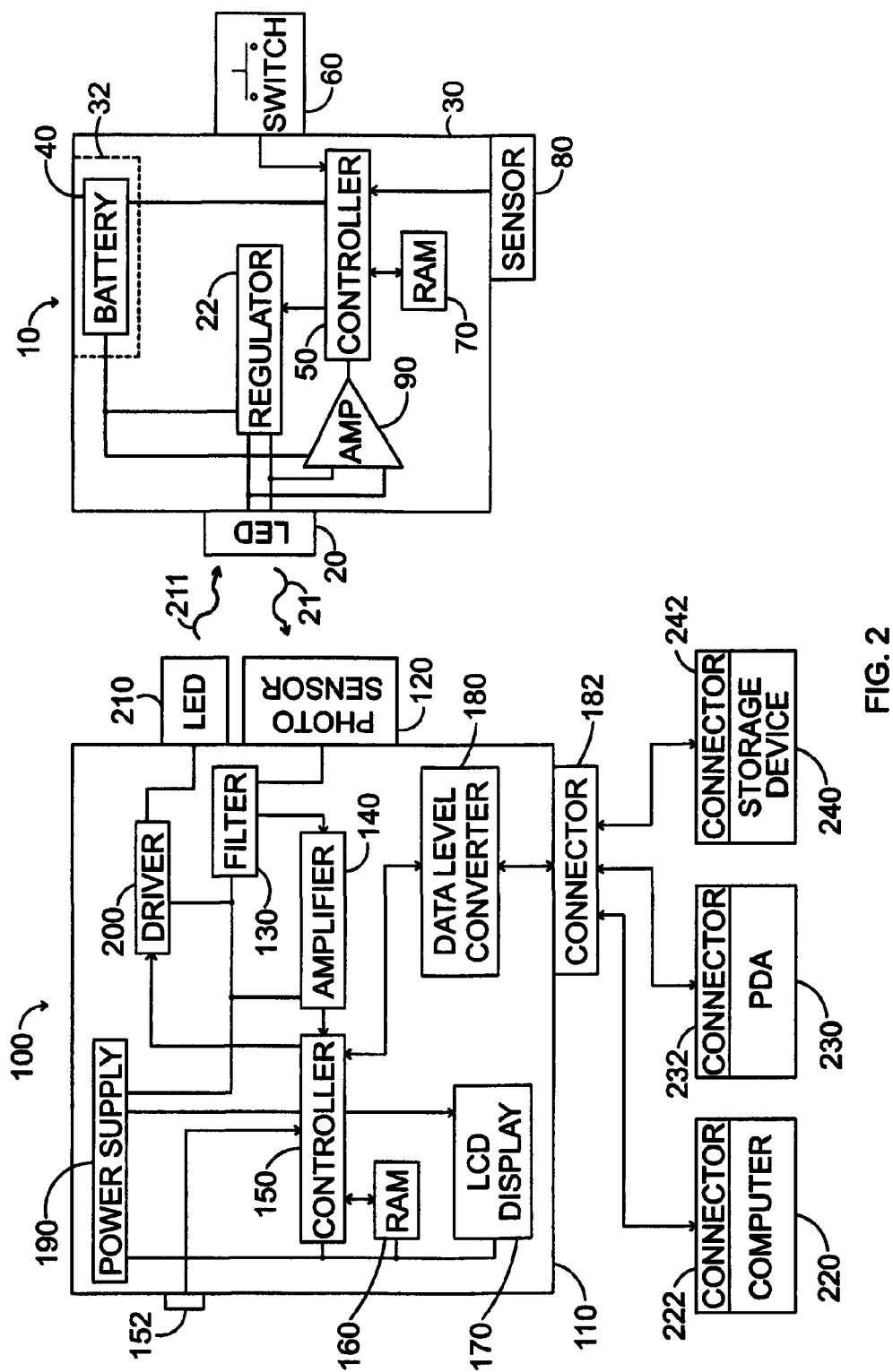
FIG. 2 is a block diagram of the example portable light and receiver therefor as illustrated in FIG. 1.

FIG. 2 is a block diagram of the example portable light and receiver therefor as illustrated in FIG. 1. A portable light 10 for producing illumination may comprise: a light source 20 that produces illumination when energized; a housing 30 supporting light source 20 and having a cavity 32 for receiving an electrical power source 40 therein; a controller or processor 50 for selectively energizing light source 20 to produce illumination when an electrical power source 40 is in the cavity 32 of housing 30; a switch 60 coupled to processor 50 for controlling the selective energization of light source 20 to produce illumination; a memory 70 coupled to processor 50 and storing data relating to portable light 10; wherein processor 50 causes modulation of light source 20 responsive to the data stored in memory 70 in addition to selectively energizing light source 20 to produce illumination.

Portable light 10 may be a flashlight, a lantern, a spot light, a head-mountable light, a light mountable on an object, e.g., mountable on a gun, a pen light, or any other type of portable light. Light source 20 preferably includes a solid state light source 20, such as a light emitting diode or a laser diode, but may include an incandescent light source 20, such as a halogen lamp, a xenon lamp, a krypton lamp, or a tungsten-filament lamp, in certain embodiments.

Housing 30 may be made of any suitable material or combination of materials, such as a metal, e.g., brass or aluminum, or of a plastic material, such as a nylon, ABS plastic, or the like, and has battery contacts in an internal cavity 32 into which an electrical power source 40, typically a battery 40, is placed for providing electrical power for operating portable light 10 via the internal battery contacts. Suitable batteries 40 include single-use batteries, such as alkaline and lead-acid batteries, and rechargeable batteries, such as nickel-cadmium batteries, nickel-metal-hydride batteries, and lithium-ion batteries, any of which may have one or more battery cells and/or may be packaged in a battery pack.

Light 10 is controlled by a controller or processor 50 which may be of any suitable type, however, a digital controller, typically embodied in a digital processor or a microprocessor, is generally preferred. Processor 50 may be a standard type of microprocessor or may be a special purpose processor or a custom processor. In any case, processor 50 is responsive to the opening and/or closing of contacts of switch 60 for controlling the operation of light 10. Switch 60 may be a single contact switch or a plural contact switch, may be normally open or normally closed, and/or may have a momentary action or continuous action contacts. Switch 60 may be located at any convenient location on housing 20, e.g., on the top side of a lantern style light 10, or on the side and/or in the tail of a flashlight 10.

For example, processor 50 may respond to actuation of switch 60 to energize light source 20 to turn it "ON" to produce illumination and to de-energize light source 20 to turn it "OFF" and not produce illumination. Typically, processor 50 controls a regulator circuit 22, such as a current regulator 22, that applies and controls the current flowing through LED light source 20. In addition, processor 50 may respond to the time duration of and/or to the time between actuations of switch 60 to operate light 10 in different modes, such as momentary ON, continuous ON, flashing, blinking, dimmed, and un-dimmed modes, e.g., to produce different illuminations.

In the present arrangement, processor 50 may respond to actuations of switch 60 to initiate (start) transmission of the data stored in memory 70 and/or to end (stop) such transmissions, and may further respond to select the data stored in memory 70 that is to be transmitted, which are operations and operating modes not found in conventional lights. In a typical light 10, a certain actuation of switch 60 may start the transmission of data from memory 70 and the transmission of data may continue until all of the data stored in memory 70 is transmitted, which may be referred to as a "data dump" mode. Examples of actuations of switch 60 that may be utilized for commencing data transmission may include, e.g., holding switch 60 actuated (e.g., depressed) for an extended period of time, such as 10 seconds, or actuating switch 60 plural times within a short period of time, such as twice within one second, of holding switch 60 actuated while installing a battery 40 into housing 20 of light 10. Further, where a light 10 includes plural light sources 20 that are energized in response to a series of switch 60 actuations, a user may "program" light 10 to preferentially energize a particular one of the plural light sources 20, as might be desired, e.g., by a fire fighter who desires to enable a blinking marker light feature, by a soldier who desires to disable a blinking marker light feature, or by a pilot and others who may desire to preferentially utilize a green light which would not affect their night vision. Such user programming could be done by entering programming information using switch 60, e.g., by a certain sequence and/or timing of switch actuations.

In particular, processor 50 typically modulates the energization of light source 20 by current control 22 in accordance with the values of data stored in memory 70 so that the light produced by light source 20 includes modulated data representative of the data stored in memory 70, e.g., as shown by wavy line 21. The modulation of the light provided by light source 20 may be relatively small in comparison to the amount of illumination produced, e.g., modulated data may be transmitted while light source 20 is energized for providing illumination, or the modulation may comprise all or a substantial part of the light produced by light source 20, e.g., modulated data is transmitted while light source 20 is generally not producing light for purposes of illumination, which is typically the preferred operation. In a typical light 10, the data from memory 70 is modulated and transmitted by processor 50 and light source 20 at a frequency in the range of 100-200 KHz., also referred to as a baud rate of 50K-100K baud.

Data relating to portable light 10 that may be stored in memory 70 and may be utilized by processor 50 for modulating light source 20 may include: model number data, part number data, serial number data, manufacturing data, electrical power source data, battery data, electrical power source charging data, battery charging data, operating time data, operating mode data, user operating mode settings, switch actuation data, voltage data, current data, temperature data, processor data, firmware data, failure data, diagnostic data, or repair data, or any combination of any of the foregoing.

Memory 70 may include non-volatile read-only memory and/or non-volatile read/write memory as may be desired. For example, data stored by the manufacturer, e.g., model and part number, serial number and date of manufacture may be stored in a read-only memory such as an EPROM as might operating firmware, whereas other data, e.g., operating data and settings, may be stored in non-volatile memory such as RAM. All data could be stored in the same kind of memory 70 which may be part of processor 50 or may be wholly or partly separate therefrom.

Processor 50 may cause modulation of light source 20 responsive to the data stored in memory 70 to produce a data message 21 comprising a series of data packets including at least one data packet defining the data transmitted and at least one data packet containing the defined data. The data message 21 may be headed by a start data packet and may be concluded by a stop data packet.

The portable light 10 may further comprise a sensor 80 of a condition to which portable light 10 is exposed, and the data relating to portable light 10 that may be stored in memory 70 may include data produced by sensor 80. Sensor 80 may include: a temperature sensor, a moisture sensor, an environment sensor, an accelerometer, a location sensor, e.g., a GPS locator, an a pedometer, audio transducer, a physiological sensor, an image sensor, a video image sensor, an atmosphere sensor, a gas sensor, a chemical sensor, a biological agent sensor, or a radiation sensor, or any other suitable sensor, or any combination of any of the foregoing.

The data produced by sensor 80 may include: temperature data, moisture data, environment data, acceleration data, location data, GPS coordinate data, pedometer data, audio data, physiological data, an image, video images, atmospheric composition data, gas data, chemical data, biological agent data, radiological data, or any other measurable data, or any combination of any of the foregoing.

The portable light is preferably utilized in combination with a receiver 100 that may comprise: a light sensitive receiver 120 for receiving modulated data emitted 21 by light source 20 of light 10 and providing an electrical representation thereof that is filtered 130 and amplified 140 before being coupled to receiver processor 150. Light sensitive receiver 120 may be, e.g., a photo-voltaic cell, a photo detector diode or other suitable light to electrical conversion device. Filter 130 typically may be a band-pass filter 130 that attenuates signals at frequencies (baud rates) lower than that to the transmitted data, such as daylight, room lighting, typically at 60 or 120 Hz., and other interfering light, and that also attenuates signals at frequencies (baud rates) higher than that of the transmitted data. Amplifier 140 increases the amplitude of the received modulated data signal to a level suitable for being applied to and processed by processor 150. The functions of filter 130 and amplifier 140 may be provided by a single band-pass amplifier circuit 130, 140.

Receiver processor 150 demodulates/decodes the received modulated data as filtered 130 and amplified 140 to reproduce a representation of the data stored in memory 70 of portable light 10. Demodulation and/or decoding may be performed by digital filtering and/or other known processing techniques. The receiver processor 150 then provides the demodulated/decoded received data for perception by a human and/or for use by a computing device. Receiver 100 may further comprise a display 170, e.g., an LCD text display of a suitable number of characters, e.g., a 4×20 LCD text display, for displaying the demodulated and/or decoded data.

Alternatively and/or additionally and/or optionally, the received demodulated and/or decoded data may be coupled via level converter 180 and connector 182 to an external device, e.g., typically by a serial data transfer. Data transfer may employ any suitable hardware standard, e.g., RS-232, wireless, USB, which can be used for sending un-encoded and encoded data, such as PEG, MPEG, text, ASCII, and the like.

A computer 220, such as a personal computer, portable computer and/or laptop computer 220 may be connected to receiver 100 via connector 182 and cable and connector 222 and the received data may be further processed thereby and displayed on the computer display of computer 220 for displaying the decoded received data in a human perceivable form. A personal digital device 230, such as a personal digital assistant, Blackberry device, cellular telephone, iPhone device and the like, may be connected to receiver 100 via connector 182 and cable and connector 232 and the received data may be further processed thereby and displayed on the computer display of personal device 230 for displaying the decoded received data in a human perceivable form. Further a memory device 240, such as a USB drive, "thumb" drive or the like may be connected to receiver 100 via connector 182 and cable and connector 242 and the received data may be stored thereby for later further processing or for backup.

The computing device may include: a personal computer, a portable computer, a laptop computer, a computer display, a personal digital device, a mobile computing device, a mobile communication device, a memory device, and any combination of any of the foregoing.

Further, and optionally, the receiver 100 may further comprise: a receiver light source 210 receiving modulated data from receiver processor 150, wherein receiver light source 210 emits light (represented by wavy line 211) representative of the modulated data received from receiver processor 150 via a suitable driver 200. Preferably, the modulated light emitted by receiver light source 210 is incident upon solid state light source 20 of portable light 10 which acts as a receiving device responding by converting incident light into electrical signals. Receiver light source 210 may employ the same kinds of LEDs as are employed in light 10 for providing illumination and data modulated signals Such LEDs may include so-called "white" LEDs rated in the range of 3-4 watts, which are suitable for illumination service in flashlights and other lights. Such "white" LEDs typically emit "blue-ish" light and include yellow phosphors so that the emitted light appears to be white light.

Correspondingly, portable light 10 may include elements for receiving and responding to the data modulated light produced by receiver light source 210, and in such event may further comprise: an optional amplifier 90 coupling signals representative of the incident modulated light from light source 20 to processor 50, wherein processor 50 decodes the data modulated on the received modulated light 211. Typically, an LED 20 connected to a high resistance load may produce a signal up to two volts in response to relatively high intensity light impinging thereon, e.g., acting as a photovoltaic device, and so an amplifier 90 having high input resistance is desirable. While an amplifier 90 having a differential input may be preferred, an amplifier 90 having a single-ended input exhibiting suitably high input resistance will be satisfactory in many if not most cases. Certain processors 50 of a more sophisticated design may include interfacing circuits such as amplifiers, digital-to-analog converters, output drivers, and the like.

One useful application of having a light 10 that can receive data transmissions as well as transmit data to a receiver 100 would be to utilize the two-way communication capability to provide error checking and/or correction for the data transmission as the data is transmitted from light 10 to receiver 100. In that instance, receiver 100 would typically transmit a return data packet 211 to light 10 that may contain, e.g., check information such as parity codes, error detection codes, error correction codes, and the like or may extend to transmitting the entire received message which is received by light source 20 and is decoded and checked, e.g., compared, by processor 50 against the data stored in memory 70 that was transmitted.

Another useful application for a light 10 as shown is that it could receive data that includes instructions as to the operation of light 10, e.g., in setting and/or disabling operating modes, switch 60 actuation patterns for various functions, and the like. In addition, programming data could be provided, e.g., for updating the firmware and/or other software that controls the operation and functioning of processor 50, for controlling operation of one or more sensors 80, e.g., for setting a timing sequence for sampling a particular parameter and/or for operating a particular sensor 80 such as an imager.

Another useful application for a light 10 as shown is that it could be utilized to communicate data to another light 10 wherein data transmitted by LED light source 20 of the one light 10 is received by the LED light source 10 of the other light 10 and the processor 50 of the other light 10 demodulates the received data and stores that received data in its memory 70. This feature is seen to be advantageous where certain operating modes and setting are desired and can, once set in one light 10, may then be transferred to another light or lights 10, as might be desired by a user who is replacing a light or by an entity desiring its lights to be set up to predetermined operating modes and settings. Such modes and settings may include, e.g., enabling a blinking marker light as might be desirable for a fire fighter's light but would not be desirable for a soldier's light, or enabling a green light to turn ON in response to a first switch actuation as might be desirable for pilots and others who may desire to utilize a light without affecting their night vision.

Figure 3:
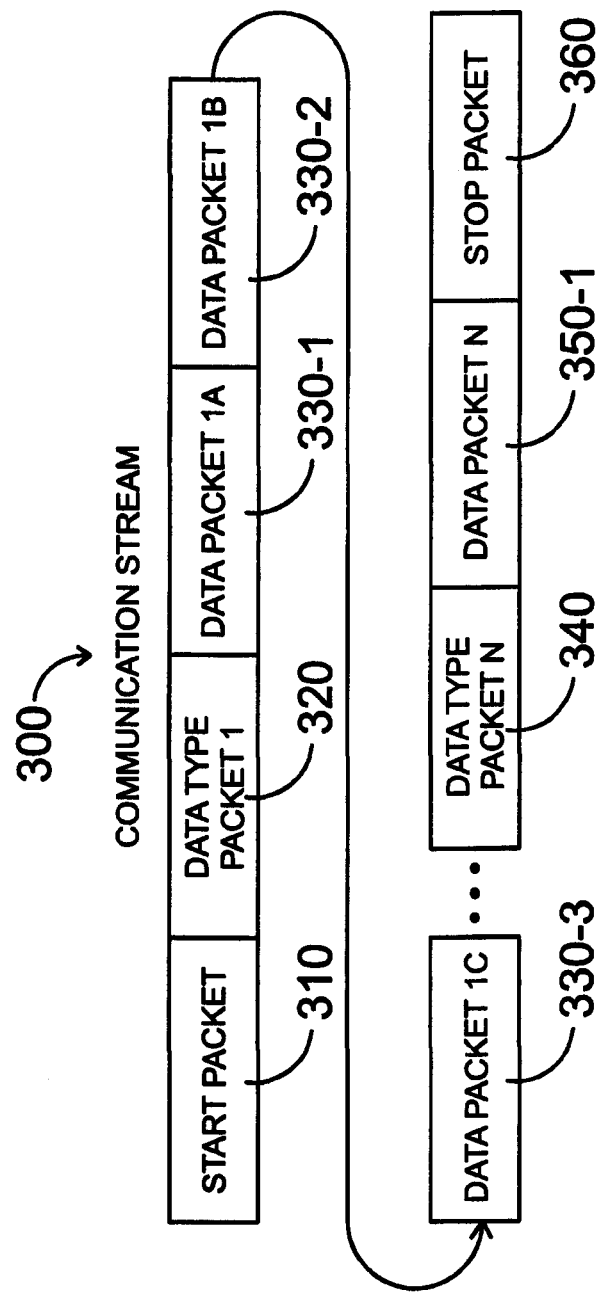
FIG. 3 is a diagrammatic representation of an example data transmission relating to the example portable light and receiver illustrated in FIGS. 1 and 2.
Figure 4:
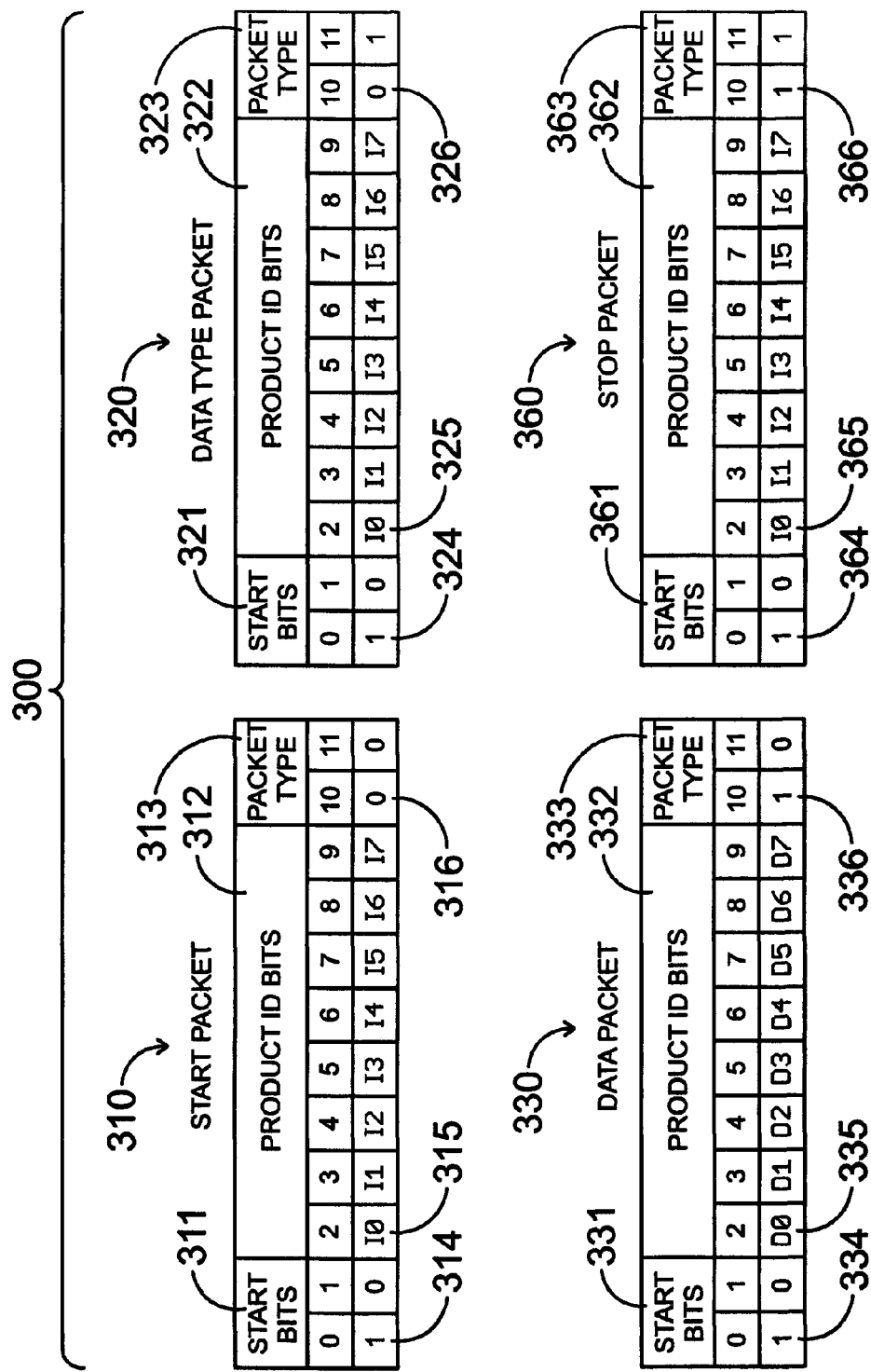
FIG. 4 is a diagrammatic representation of example data packets of the example data transmission of FIG. 3.

FIG. 3 is a diagrammatic representation of an example data transmission 300 relating to the example portable light 10 and receiver 100 therefor illustrated in FIGS. 1 and 2, and FIG. 4 is a diagrammatic representation of example data packets 310-360 of the example data transmission 300 of FIG. 3. Data transmission 300 or message 300 represents the communicating, e.g., sending and/or receiving, of data in a packetized manner wherein the message 300 comprises a series of packets of data beginning with a start packet 310 that indicates the beginning of message 300, followed by a series of packets containing data, and ending with a stop packet 360 that indicates the end of message 300. The message 300 may include any number of data packets, however, the first data packet is always a start packet 310 and the last data packet is always a stop packet 360. Typically, light 10 may be programmed to exit the data transmission mode following the transmission of the stop packet 360, e.g., where the message is complete and all the data that is available in memory 70 and/or from sensors 80 to be transmitted has been transmitted.

Data packets 310-360 of message 300 are preferably of four different types, e.g., a start packet 310, a data type packet 320, a data packet 330 and a stop packet 360, each serving a particular function in message 300. As a result, the length and formatting of message 300 may be variable given the particular data and types of data that are to be communicated, e.g., for reducing or minimizing the message length and increasing transmission efficiency. However, message 300 may be of a fixed length and may include data packets 330 in a predetermined sequence and coding without data type packets 320.

In the illustrated example message, each data packet 310-361 comprises, e.g., twelve bits of information, of which the first two bits (bits 0 and 1; items 311, 321, 331, 361) are start bits of the packet, e.g., of value "1,0" (items 314, 324, 334, 364), followed by eight data bits (bits 2-9) which are an eight-bit data word (or byte) having a value representative of data, followed by the final two bits (bits 10-11) which by their value indicate the type of the data packet. Data bits 2-9 which are item 312 of start packet 310 and are item 362 of stop packet 360 are of a value I0-I17 (items 315, 365) that preferably represents the identification of the product that is transmitting the data or some other identifier. Those product identifier bits 2-9 could represent, e.g., a model number, a serial number, or both, for portable light 10. Packet type bits 10-11 which are item 313 of start packet 310 have a value 316, e.g., "0,0", indicating that the packet is a start packet 310 and item 363 of stop packet 360 have a value 366, e.g., "1,1", indicating that the packet is a stop packet 360.

Data type packet 320 includes data type bits T0-T7 (item 322) the value of which defines the format and/or type of the data contained in immediately following data packets 330-1, 330-2, 330-3, ... 330-$n$, the number of which may be between one and a number "n". The value 325 of data type bits T0-T7 may represent the type of data, e.g., switch actuations, temperature, battery condition, and the like, and/or sensor data, e.g., temperature in ° F., temperature in ° C., pressure, quantity and/or concentration of a gas, chemical or agent, and the like, that is represented by the values 335 of data bits D0-D7 of the following data packet 330. The value 325 of data type bits T0-T7 may additionally and/or alternatively indicate the numeric coding of the data bits D0-D7, e.g., as an integer value, as a floating point value and exponent, as a number with a decimal point in a predetermined location, as a binary coded value, as a binary-coded decimal value, as a twos-complement coded value, and the like.

A transmission 300 may include one or more data type packets 320, 340 defining the data to follow, each of which data type packets 320, 340 is followed immediately by one or more data packets 330, 350 containing the defined data. In the illustrated example, a first group comprising a data type packet 1 and data packets 1A, 1B, 1C is shown, and a final group comprising a data type packet N and data packet N is shown, and groups of data type packets and data packets therebetween, if any, could be but are not shown for simplicity.

In example message 300, the inclusion of data type packet 340 and its data packet 350 illustrates that more than one type of data packets 320, 330 may be utilized, and in general, up to an undefined number N of different data packet types may be utilized in a given message 300. Just as data packets 330-1, 330-2, 330-3 contain data as defined by data type packet 320, data packet 350-1 contains data as defined by data type packet 340.

Figure 5:
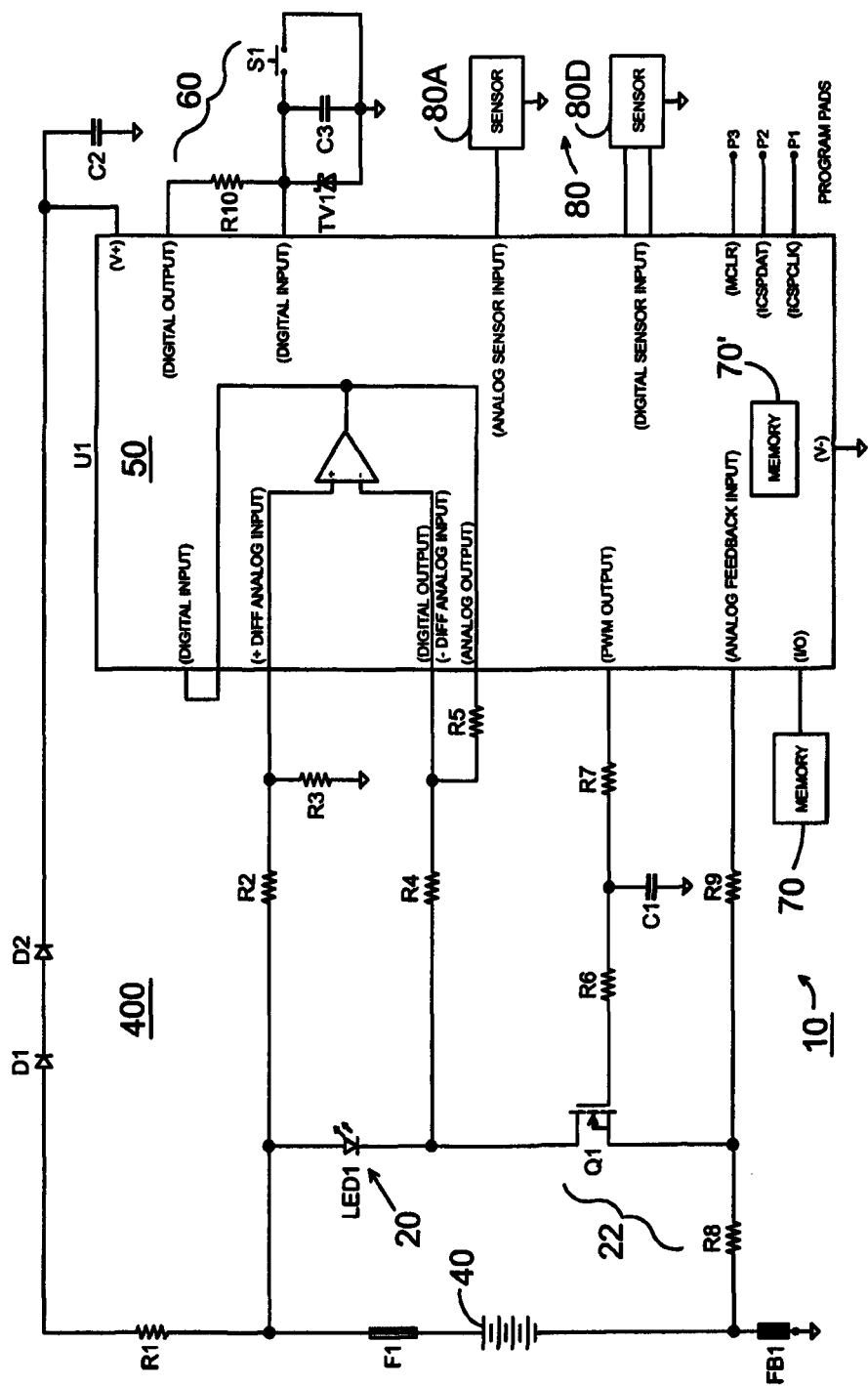
FIG. 5 is an electrical schematic diagram of an example flashlight including an example data transmission circuit.

FIG. 5 is an electrical schematic diagram of an example flashlight 10 including circuit 400 providing illumination and data transmission and reception. In operation in an illumination producing mode of light 10, circuit 400 selectively applies electrical power from battery 40 to an illumination light source 20 comprising an LED under control of an FET transistor Q1, the conductivity of which is controlled by processor 50, U1 responsive to signals generated by the closing and/or opening of the contacts of switch S1 of switch circuit 60. A high level "1" output at the Digital Output of processor 50 is applied at the Digital Input thereof via resistor R10 when switch S1 is open, and a "0" level is presented thereat via resistor R10 when switch S1 is closed. Zener diode TV1 and capacitor C3 limit and smooth the signal at the Digital Input to processor 50, thereby to make more consistent the signaling of inputted information from switch S1 to processor 50. Battery 40 is preferably and/or typically a battery 40 comprising plural alkaline or nickel-cadmium cells, e.g., four size AA alkaline cells or four size AA Ni—Cd cells.

Specifically, the current flowing through LED 20 is sampled by resistor R8 and the value thereof is fed back via resistor R9 to an Analog Feedback Input to processor U1, 50. Processor U1, 50 responds thereto to increase and/or decrease the width of the control pulses generated at PWM Output thereof, e.g., a pulse-width modulated signal, that is filtered by resistors R6-R7 and capacitor C1 and applied as a relatively DC signal to the gate of transistor Q1 for establishing a desired current flowing through LED 20. If the current flowing through LED 20 is too high, as measured by resistor R8, the pulse-width is decreased to reduce the current flowing in LED 20 and if the current flowing through LED 20 is too low, as measured by resistor R8, the pulse-width is increased to increase the current flowing in LED 20, whereby a desired level of current is established through LED 20 to produce a desired illumination.

When circuit 400 of light 10 is called upon by actuation of switching circuit 60, S1 to transmit data via LED 20, transistor Q1 is preferably inactive (OFF) and LED 20 may be powered in a pulsed ON and OFF operation at a lower current level directly by the Digital Output of processor 50 via resistor R4 through which current is carried to its V-terminal which is the negative terminal of battery 40 (since LED 20 is connected to the positive terminal of battery 40 via fuse F1). Operation at such lower current level produces sufficient light output 21 from LED 20 to be reliably detectable by receiver 100. One advantage of this mode of operation is that the capacitor C1 that provides a low-pass filter that smooths the PWM Output from processor 50, which may be at a relatively high frequency, e.g., 4 MHz, does not limit the bandwidth or baud rate of the data transmitted by circuit 400 via LED 20.

Data transmitted by LED 20 responsive to the voltages applied thereto via the Digital Output of processor 50 via resistor R4 may include data stored by processor 50 in an external memory 70 connected via input/output port I/O and/or in an internal memory 70' in the course of its normal operation responsive to switch S1, 60. Data transmitted by LED 20 may also include data generated by one or more sensors 80. Sensors 80 may include, e.g., one or more analog sensors 80A connected to processor 50 via one or more Analog Sensor Input ports thereof and/or one or more digital sensors 80D connected to processor 50 via one or more Digital Sensor Input ports thereof. It is noted that data produced by processor 50 and/or data received by processor 50 may be encoded and/or modulated in any suitable form of encoding and/or modulation, of which many are known to those of ordinary skill in the art.

When circuit 400 of light 10 is called upon by actuation of switching circuit 60, S1 to receive data 211 via LED 20, LED 20 may be pulsed ON and OFF in response to the incident light to generate a voltage thereby that is applied via resistors R2, R3 to the +Differential Analog Input of amplifier 90 and via resistors R4, R5 to the −Differential Analog Input thereof. Typically, differential input amplifier 90 has substantial gain and so functions similarly to a comparator to provide at its Analog Output a signal that is either High or Low and so may be directly applied as a digital signal to the Digital Input of processor 50, as is generally appropriate, particularly where the data 211 received is modulated in a digital format, e.g., pulse code modulation.

The port of processor 50 that provides both a Digital Output and a −Differential Analog Input is programmable between those two functions (modes) in response to signaling from switch S1, 60, e.g., signaling for circuit 400 to be in a mode for transmitting data 21 via LED 20 and in a mode for receiving data 211 via LED 20. Programming inputs may be provided to processor 50 via programming pads coupled to ports MCLR, ISCPDAT and ICSCLK or processor 50 inconventional manner.

In a typical circuit 400, LED 20 may carry a current in the range of about 500 to 1000 milli-amperes when producing illumination and may carry a current of about 5-10 milliamperes when transmitting data 21. When receiving data in the form of light transmissions 211 impinging on LED 20, LED 20 may produce a voltage of about two volts when illuminated and about zero volts when not illuminated.

Switch S1 may be utilized to control operation of light 10 into various operating modes, both illumination modes and data operating modes. As to illumination, switch S1 may be actuated to control light 10 into typical operating modes, e.g., momentary ON, continuous ON, blinking, flashing, dimming and un-dimming modes, and OFF modes. As to data, switch S1 may be utilized to control operation of light 10 to transmit data stored therein and/or to receive data transmitted thereto, e.g., by receiver 100.

Electrical power for the operation of processor 50 is provided as relatively positive voltage via resistor R1 and diodes D1, D2 to input V+ of processor 50, U1 relative to the relatively negative voltage applied at input V− thereof. Capacitor C2 provides filtering of the voltage applied to processor 50, U1. Isolation of the negative terminal of battery 40 from the reference voltage at input V− is maintained by a ferrite bead FB1 on the conductor to battery 40. In addition, the current provided by battery 40 may be limited, e.g., by a fuse F1, as illustrated.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

The term battery is used herein to refer to an electrochemical device comprising one or more electro-chemical cells, and so a battery may include a single cell or plural cells, whether as individual units or as a packaged unit. A battery is one type of an electrical power source suitable for a portable device.

It is noted that various sensor values represent actual physical conditions of different places and/or different times, e.g., generally local conditions, that provide a representation of the state and/or condition of the conditions, e.g. environment, in which the portable light is or was operated. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time.

Although terms such as "up," "down," "left," "right," "front," "rear," "side," "top," "bottom," "forward," "backward," "under" and/or "over," may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

Image and/or video are used interchangeably with respect to what is displayed on a display device, and are intended to encompass any and all of the wide variety of displays that a user may desire, including, but not limited to, images and pictures, whether still or moving, whether generated by a camera, computer or any other source, whether true, representative or abstract or arbitrary, whether black and white, monochrome, polychrome or full color.

While the present invention has been described in terms of the foregoing example embodiments, variations within the scope and spirit of the present invention as defined by the claims following will be apparent to those skilled in the art. For example, while light source 20 is illustrated as a single LED 20, light source 20 in a particular embodiment may include plural light sources, e.g., both plural solid state light sources and conventional incandescent light sources. In any event, it is generally preferred that one or more of the solid state light sources 20 be utilized for the transmission of data 21 and/or for the receiving of data 211.

Alternatively, light 10 and circuit 400 may transmit data 21 by controlling transistor Q1, in which case capacitor C1 may be removed and the capacitance of the gate electrode of transistor Q1 may provide sufficient filtering of the PWM Output signal provided by processor 50 in the illumination mode, but is small enough so as to not interfere with the transmission of data 21 when light 10 and circuit 400 is transmitting data via LED 20.

Each of the U.S. Provisional Applications, U.S. patent applications, and/or U.S. patents identified herein are hereby incorporated herein by reference in their entirety, for any purpose and for all purposes irrespective of how it may be referred to herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light for producing illumination and for transmitting data comprising:
   a light source producing light when energized;
   a housing supporting said light source and having a cavity for receiving an electrical power source;
   a processor for selectively energizing said light source to produce light when an electrical power source is in the cavity of said housing;
   a memory coupled to said processor and storing data relating to said portable light, and
   a switch coupled to said processor for controlling the selective energization of said light source,
   wherein a certain predetermined actuation of said switch causes said processor to energize said light source at a relatively higher current to produce illumination; and
   wherein another predetermined actuation of said switch causes said processor to modulate said light source at a relatively lower current responsive to the data stored in said memory, whereby the stored data is transmitted via said light source in addition to the selectively energizing said light source to produce illumination.

2. The portable light of claim 1 wherein the data relating to said portable light includes: model number data, part number data, serial number data, manufacturing data, electrical power source data, battery data, electrical power source charging data, battery charging data, operating time data, operating mode data, switch actuation data, voltage data, current data, temperature data, processor data, firmware data, failure data, diagnostic data, or repair data, or any combination of any of the foregoing.

3. The portable light of claim 1 further comprising a sensor of a condition to which said portable light is exposed, wherein the data relating to said portable light includes data produced by said sensor.

4. The portable light of claim 3 wherein said sensor includes: a temperature sensor, a moisture sensor, an environment sensor, an accelerometer, a location sensor, a GPS locator, a pedometer, an audio transducer, a physiological sensor, an image sensor, a video image sensor, an atmosphere sensor, a gas sensor, a chemical sensor, a biological agent sensor, or a radiation sensor, or any combination of any of the foregoing.

5. The portable light of claim 3 wherein the data produced by said sensor includes: temperature data, moisture data, environment data, acceleration data, location data, GPS coordinate data, pedometer data, audio data, operator physiological data, an image, video images, atmospheric data, gas data, chemical data, biological agent data, radiological data, or any combination of any of the foregoing.

6. The portable light of claim 1 wherein said light source includes a light emitting diode that produces light responsive to electrical energization and that produces an electrical signal responsive to light incident thereon, and wherein said portable light further comprises:
   an amplifier coupling signals representative of incident modulated light impinging on said light source to said processor;
   wherein said processor decodes data modulated on the incident modulated light.

7. The portable light of claim 1 wherein said processor causing modulation of said light source responsive to the data stored in said memory produces a data message comprising a series of data packets including at least one data packet defining the data transmitted and at least one data packet containing the defined data.

8. The portable light of claim 7 wherein the data message is headed by a start data packet and is concluded by a stop data packet.

9. The portable light of claim 1 in combination with a receiver comprising:
   a light sensitive receiver for receiving modulated data emitted by said light source; and a receiver processor decoding the received modulated data to reproduce a representation of the data stored in said memory of said portable light, wherein said receiver processor provides the decoded received data for perception by a human and/or for use by a computing device.

10. The portable light and receiver of claim 9 further comprising a display and/or a computer display for displaying the decoded received data in a human perceivable form.

11. The portable light and receiver of claim 9 wherein said computing device includes: a personal computer, a portable computer, a laptop computer, a computer display, a personal digital device, a mobile computing device, a mobile communication device, a memory device, and any combination of any of the foregoing.

12. The portable light and receiver of claim 9:
wherein said receiver further comprises:
a receiver light source receiving modulated data from said receiver processor, said receiver light source emitting light representative of the modulated data received from said receiver processor;
wherein the modulated light emitted by said receiver light source is incident upon said light source of said portable light;
wherein said light source of said portable light includes a light emitting diode that produces light responsive to electrical energization and that produces an electrical signal responsive to light incident thereon, and wherein said portable light further comprises:
an amplifier coupling signals representative of the incident modulated light from said light source to said processor; and
wherein said processor decodes data modulated on the incident modulated light.

13. The portable light of claim 1 wherein the relatively higher current includes a current in a range of about 500-1000 milliamperes and wherein the relatively lower current includes a current in a range of about 5-10 milliamperes.

14. The portable light of claim 1 wherein the modulated data is transmitted while said light source is energized by the relatively higher current for producing light for illumination, or wherein the modulated data is transmitted while said light source is not energized for producing light for illumination, or wherein the modulated data is transmitted while said light source is energized by the relatively higher current for producing light for illumination and while said light source is not energized for producing light for illumination.

15. A system including a portable light for producing illumination and transmitting data and a receiver for receiving data transmitted by said portable light,
wherein said portable light comprises:
a light source producing light when energized;
a housing supporting said light source and having a cavity for receiving an electrical power source;
a processor for selectively energizing said light source to produce light when an electrical power source is in the cavity of said housing;
a memory coupled to said processor and storing data relating to said portable light, and
a switch coupled to said processor for controlling the selective energization of said light source,
wherein a certain predetermined actuation of said switch causes said processor to energize said light source at a relatively higher current to produce illumination; and
wherein another predetermined actuation of said switch causes said processor to modulate said light source at a relatively lower current responsive to the data stored in said memory, whereby the stored data is transmitted via said light source in addition to the selectively energizing said light source to produce illumination; and
wherein said receiver for receiving data transmitted by said portable light comprises:
a light sensitive receiver for receiving modulated data emitted by said light source; and
a receiver processor decoding the received modulated data to reproduce a representation of the data stored in said memory of said portable light,
wherein said receiver processor provides the decoded received data for perception by a human and/or for use by a computing device.

16. The portable light and receiver of claim 15 wherein the data relating to said portable light includes: model number data, part number data, serial number data, manufacturing data, electrical power source data, battery data, electrical power source charging data, battery charging data, operating time data, operating mode data, switch actuation data, voltage data, current data, temperature data, processor data, firmware data, failure data, diagnostic data, or repair data, or any combination of any of the foregoing.

17. The portable light and receiver of claim 15 wherein said portable light further comprises a sensor of a condition to which said portable light is exposed, wherein the data relating to said portable light includes data produced by said sensor.

18. The portable light and receiver of claim 17 wherein said sensor includes: a temperature sensor, a moisture sensor, an environment sensor, an accelerometer, a location sensor, a GPS locator, an audio transducer, an image sensor, a video image sensor, a gas sensor, a chemical sensor, a biological agent sensor, or a radiation sensor, or any combination of any of the foregoing.

19. The portable light and receiver of claim 17 wherein the data produced by said sensor includes: temperature data, moisture data, environment data, acceleration data, location data, GPS coordinate data, audio data, an image, video images, gas data, chemical data, biological agent data, radiological data, or any combination of any of the foregoing.

20. The portable light and receiver of claim 15 wherein said light source of said portable light includes a light emitting diode that produces light responsive to electrical energization and that produces an electrical signal responsive to light incident thereon, and wherein said portable light further comprises:
an amplifier coupling signals representative of incident modulated light impinging on said light source to said processor;
wherein said processor decodes data modulated on the incident modulated light.

21. The portable light and receiver of claim 15 wherein said processor causing modulation of said light source responsive to the data stored in said memory produces a data message comprising a series of data packets including at least one data packet defining the data transmitted and at least one data packet containing the defined data.

22. The portable light and receiver of claim 21 wherein the data message is headed by a start data package and is concluded by a stop data packet.

23. The portable light and receiver of claim 15 further comprising a display and/or a computer display for displaying the decoded received data in a human perceivable form.

24. The portable light and receiver of claim 15 wherein said computing device includes: a personal computer, a portable computer, a laptop computer, a computer display, a personal digital device, a mobile computing device, a mobile communication device, a memory device, and any combination of any of the foregoing.

25. The portable light and receiver of claim 15:
   wherein said receiver further comprises:
      a receiver light source receiving modulated data from said receiver processor, said receiver light source emitting light representative of the modulated data received from said receiver processor;
   wherein the modulated light emitted by said receiver light source is incident upon said light source of said portable light;
   wherein said light source of said portable light includes a light emitting diode that produces light responsive to electrical energization and that produces an electrical signal responsive to light incident thereon, and wherein said portable light further comprises:
      an amplifier coupling signals representative of the incident modulated light from said light source to said processor; and
      wherein said processor decodes data modulated on the incident modulated light.

26. The portable light and receiver of claim 15 wherein the relatively higher current includes a current in a range of about 500-1000 milliamperes and wherein the relatively lower current includes a current in a range of about 5-10 milliamperes.

27. The portable light and receiver of claim 15 wherein the modulated data is transmitted while said light source is energized by the relatively higher current for producing light for illumination, or wherein the modulated data is transmitted while said light source is not energized for producing light for illumination, or wherein the modulated data is transmitted while said light source is energized by the relatively higher current for producing light for illumination and while said light source is not energized for producing light for illumination.

28. A receiver for receiving modulated data transmitted by a portable light wherein the data is stored in a memory of the portable light and is transmitted by an light source thereof that produces light for illumination and modulated light representing data,
   said receiver for receiving data transmitted by the light source of the portable light comprising:
      a receiver housing;
      a light sensitive receiver located in said receiver housing for receiving modulated light representing data emitted by the light source of the portable light and for providing an electrical signal representative thereof;
      said light sensitive receiver including a light emitting diode that produces light responsive to electrical energization and that produces an electrical signal responsive to light incident thereon, wherein said light emitting diode is energized by a relatively higher current for producing illumination and by a relatively lower current representing modulated data,
      a high input impedance amplifier directly coupled to said light emitting diode for receiving and amplifying the electrical signal representative of the data, and
      a receiver processor decoding the amplified electrical signal representative of the received modulated data to reproduce a representation of the data stored in the memory of the portable light,
      wherein said receiver processor provides the decoded received data for perception by a human and/or for use by a computing device.

29. The receiver of claim 28 further comprising a display and/or a computer display for displaying the decoded received data in a human perceivable form.

30. The receiver of claim 28 wherein said computing device includes: a personal computer, a portable computer, a laptop computer, a computer display, a personal digital device, a mobile computing device, a mobile communication device, a memory device, and any combination of any of the foregoing.

31. The receiver of claim 28 wherein the light emitting diode of said light sensitive receiver receives modulated data from said receiver processor, said receiver light emitting diode emitting light representative of the modulated data received from said receiver processor;
   wherein the modulated light emitted by said receiver light emitting diode is emitted to be incident upon a light source of a portable light;
   wherein the portable light further comprises:
      a light source including a light emitting diode upon which the modulated light emitted by said receiver light source is incident, wherein said light emitting diode produces light responsive to electrical energization and produces an electrical signal responsive to light incident thereon; and
      an amplifier coupling the electrical signals representative of the incident modulated light from the light source to a processor; wherein the processor decodes data modulated on the incident modulated light.

32. The receiver of claim 28 wherein the relatively higher current includes a current in a range of about 500-1000 milliamperes and wherein the relatively lower current includes a current in a range of about 5-10 milliamperes.

* * * * *